(12) United States Patent
Qi et al.

(10) Patent No.: US 9,201,452 B2
(45) Date of Patent: Dec. 1, 2015

(54) ELECTRONIC DEVICE WITH ILLUMINATED LOGO STRUCTURES

(75) Inventors: Jun Qi, Cupertino, CA (US); Victor H. Yin, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 79 days.

(21) Appl. No.: 13/407,492

(22) Filed: Feb. 28, 2012

(65) Prior Publication Data

US 2013/0222736 A1 Aug. 29, 2013

(51) Int. Cl.
| | | |
|---|---|---|
| *G02F 1/1335* | (2006.01) | |
| *G02B 6/10* | (2006.01) | |
| *G06F 1/16* | (2006.01) | |
| *F21V 3/00* | (2015.01) | |
| *F21V 8/00* | (2006.01) | |
| *G02F 1/1333* | (2006.01) | |

(52) U.S. Cl.
CPC ............ *G06F 1/1601* (2013.01); *G06F 1/1637* (2013.01); *G02B 6/002* (2013.01); *G02B 6/006* (2013.01); *G02B 6/0016* (2013.01); *G02B 6/0045* (2013.01); *G02F 2001/133342* (2013.01)

(58) Field of Classification Search
CPC .......... G02F 1/133608; G02F 2203/02; G02F 1/133606; G02F 1/1336; G02F 2001/133314; G02F 2001/133342; G02F 1/1335; G02F 1/133524; G02F 2001/133322; G02F 1/133602; G02F 1/13471; G02F 1/1347; G02F 1/13476; G02B 6/0038; G02B 6/0055; G02B 6/00; G02B 6/0021; G02B 6/0043; G02B 6/005; G02B 6/0018; G02B 6/0016; G02B 6/0076; G02B 6/003; G02B 6/0035; G02B 6/0041; G02B 6/0023; G02B 6/0063; G02B 5/0221; G02B 6/0033; G02B 5/124; G02B 6/0046; G02B 6/002; G02B 6/0028; G02B 6/0091; G02B 6/008; G02B 6/0071; G02B 6/0011; G02B 6/0045; G02B 6/006; G02B 6/0096; G02B 27/0994; G02B 6/0058; G02B 6/0068; G02B 6/1228; G02B 6/2552; G02B 6/0088; G02B 6/12016; G02B 6/0008; G02B 27/09; G02B 2006/121
USPC ............ 349/56, 58, 61, 62, 65, 113; 361/600, 361/679.01, 679.02, 679.21, 679.26, 728; 362/154, 253, 362, 600, 602, 604, 605, 362/609, 610, 615, 616, 617, 618, 623, 624, 362/627, 632, 633, 620
See application file for complete search history.

(56) References Cited

U.S. PATENT DOCUMENTS

| | | |
|---|---|---|
| 2,964,887 A | 12/1960 | Orozco |
| 3,517,466 A | 6/1970 | Bouvier |
| 4,766,746 A | 8/1988 | Henderson et al. |
| 5,237,486 A | 8/1993 | LaPointe et al. |
| 5,531,950 A | 7/1996 | Kimura et al. |
| 5,606,438 A | 2/1997 | Margalit et al. |
| 5,611,517 A | 3/1997 | Saadi et al. |
| 5,795,430 A | 8/1998 | Beeteson et al. |
| 5,828,341 A | 10/1998 | Delamater |
| 5,881,103 A | 3/1999 | Wong et al. |
| 6,014,080 A | 1/2000 | Layson, Jr. |
| 6,122,167 A | 9/2000 | Smith et al. |
| 6,151,912 A | 11/2000 | Rose |
| 6,179,122 B1 | 1/2001 | Moncrief et al. |
| 6,416,844 B1 | 7/2002 | Robson |
| 6,494,593 B2 | 12/2002 | An et al. |
| 6,532,152 B1 | 3/2003 | White et al. |
| 6,542,384 B1 | 4/2003 | Radu et al. |
| 6,547,420 B2 | 4/2003 | Li |
| 6,791,465 B2 | 9/2004 | Blagin et al. |
| 6,846,228 B2 | 1/2005 | Lin |
| 6,853,336 B2 | 2/2005 | Asano et al. |
| 6,874,903 B2 | 4/2005 | Yang et al. |
| 6,876,543 B2 | 4/2005 | Mockridge et al. |
| 6,967,833 B2 | 11/2005 | Boykin et al. |
| 6,992,733 B1 | 1/2006 | Klein |
| 6,999,826 B1 | 2/2006 | Zhou et al. |
| 7,299,575 B2 | 11/2007 | Hutchinson et al. |
| 7,330,122 B2 | 2/2008 | Derrick et al. |
| 7,342,792 B2 | 3/2008 | Kim et al. |
| 7,369,191 B2 | 5/2008 | Okamoto et al. |
| 7,373,180 B2 | 5/2008 | Swanson et al. |

| | | | |
|---|---|---|---|
| 7,452,098 B2 | 11/2008 | Kerr | |
| 7,484,876 B2 * | 2/2009 | Kim et al. | 362/616 |
| 7,522,889 B2 | 4/2009 | Wulff et al. | |
| 7,535,547 B2 | 5/2009 | Tannas, Jr. | |
| 7,545,574 B2 | 6/2009 | Park et al. | |
| 7,583,353 B2 | 9/2009 | Kujiraoka | |
| 7,771,099 B2 * | 8/2010 | Massaro et al. | 362/602 |
| 7,808,586 B2 * | 10/2010 | Mochizuki | 349/110 |
| 7,824,078 B2 | 11/2010 | Peng et al. | |
| 7,920,228 B2 * | 4/2011 | Bae et al. | 349/73 |
| 7,927,002 B2 * | 4/2011 | Lee et al. | 362/620 |
| 7,937,865 B2 | 5/2011 | Li et al. | |
| 8,081,430 B2 | 12/2011 | Weber et al. | |
| 2001/0009509 A1 | 7/2001 | An et al. | |
| 2002/0037686 A1 | 3/2002 | Brown et al. | |
| 2002/0048148 A1 | 4/2002 | Horiuchi et al. | |
| 2003/0128316 A1 | 7/2003 | Tsuji | |
| 2003/0161093 A1 | 8/2003 | Lam et al. | |
| 2003/0197111 A1 | 10/2003 | Morimoto et al. | |
| 2004/0017529 A1 | 1/2004 | Choi et al. | |
| 2005/0069667 A1 | 3/2005 | Wacker | |
| 2006/0082956 A1 | 4/2006 | Garel et al. | |
| 2006/0268528 A1 | 11/2006 | Zadesky et al. | |
| 2006/0274534 A1 * | 12/2006 | Chang et al. | 362/362 |
| 2007/0019393 A1 | 1/2007 | Tsai | |
| 2007/0165373 A1 | 7/2007 | Merz et al. | |
| 2007/0206137 A1 | 9/2007 | Akiyama | |
| 2008/0026614 A1 | 1/2008 | Emerson et al. | |
| 2008/0237477 A1 | 10/2008 | Hoggatt et al. | |
| 2009/0088055 A1 | 4/2009 | Silva et al. | |
| 2009/0146279 A1 | 6/2009 | Griffin | |
| 2009/0175001 A1 | 7/2009 | Mathew et al. | |
| 2009/0180296 A1 * | 7/2009 | Chen et al. | 362/604 |
| 2009/0183819 A1 | 7/2009 | Matsuhira | |
| 2009/0190358 A1 | 7/2009 | Tye et al. | |
| 2010/0103641 A1 | 4/2010 | Cho et al. | |
| 2010/0110334 A1 | 5/2010 | Oki et al. | |
| 2010/0156794 A1 | 6/2010 | Sauer et al. | |
| 2010/0238667 A1 * | 9/2010 | Wu et al. | 362/310 |
| 2011/0090712 A1 * | 4/2011 | Bergeron et al. | 362/612 |
| 2011/0292322 A1 * | 12/2011 | Wu et al. | 349/65 |
| 2011/0304795 A1 * | 12/2011 | Lee et al. | 349/62 |
| 2012/0020000 A1 * | 1/2012 | Mathew et al. | 361/679.26 |
| 2012/0026423 A1 * | 2/2012 | He et al. | 349/62 |
| 2012/0133301 A1 | 5/2012 | Kerr et al. | |

FOREIGN PATENT DOCUMENTS

| | | |
|---|---|---|
| CN | 1672092 | 9/2005 |
| CN | 101488304 | 7/2009 |
| CN | 101551694 | 10/2009 |
| EP | 0683026 | 3/2001 |
| EP | 0911717 | 3/2003 |
| EP | 1621967 | 2/2006 |
| JP | 05011717 | 1/1993 |
| JP | 2002372711 | 12/2002 |
| JP | 2003174492 | 6/2003 |
| JP | 2004078047 | 3/2004 |
| JP | 2006058331 | 3/2006 |
| JP | 2010134413 | 6/2010 |
| TW | M346025 | 12/2008 |
| TW | I323364 | 4/2010 |
| WO | 2009126480 | 10/2009 |

OTHER PUBLICATIONS

Definition of term "overlap," downloaded Jan. 22, 2014 from the on-line edition of the Merriam-Webster Dictionary, located at www.merriam-webster.com.*
Block, "MacBook Air Review", Engadget, Jan. 25, 2008, [Retrieved Nov. 19, 2012]. Retrieved from the Internet: <URL: http://engadget.com/2008/01/25/Macbook-air-review>.
PowerBook G4 (15-Inch FW 800): Sound Specifications, Apple.com, Jan. 8, 2007, [Retrieved Nov. 19, 2012]. Retrieved from the Internet: <URL: http://support.apple.com/kb/TA27151?viewlocale=en_US>.
Bergeron et al., U.S. Appl. No. 12/580,886, filed Oct. 16, 2009.
Bergeron et al., U.S. Appl. No. 13/540,521, filed Jul. 2, 2012.

* cited by examiner

*Primary Examiner* — Paisley L Arendt
*Assistant Examiner* — Angela Davison
(74) *Attorney, Agent, or Firm* — Treyz Law Group; G. Victor Treyz; Joseph F. Guihan (57) ABSTRACT

An electronic device may have a liquid crystal display with backlight structures. The backlight structures may produce backlight that passes through the liquid crystal display. A reflector may be used to enhance backlight efficiency. The electronic device may have a housing in which the display is mounted. The housing may be formed from an opaque material such as metal. An opening may be formed in the housing. Transparent housing structures such as a transparent logo structure may be mounted in the opening of the housing. During operation, a light source may produce light that passes through the transparent logo structure. A light guide structure may be used to guide light from the light source to the transparent logo structure. The reflector may be formed from a coating of metal on the light guide structure. Light from the light source may be used to form the backlight for the backlight structures.

15 Claims, 10 Drawing Sheets

FIG. 10

ELECTRONIC DEVICE WITH ILLUMINATED LOGO STRUCTURES

BACKGROUND

This relates generally to electronic devices and, more particularly, to electronic devices with illuminated housing structures such as illuminated logos.

Electronic devices such as computers have housings. Components such as logic boards, keyboards, and displays may be mounted within a housing. Some computers are provided with logo structures. For example, some portable computers have metal housings with plastic logos that are illuminated using a portion of the backlight associated with a liquid crystal display in the computer.

With this type of logo illumination scheme, a fraction of the backlight for a display is purposefully allowed to leak through the rear of a backlight structure. Ensuring that there is sufficient leaked backlight available to illuminate a logo may, however, reduce backlight efficiency.

It would therefore be desirable to be able to provide improved arrangements for illuminating housing structures such as logos in electronic devices.

SUMMARY

An electronic device may have a housing. The housing may be formed from metal or other materials. A display such as a liquid crystal display may be mounted in the housing. Backlight structures may be used to produce backlight for the display. The backlight structures may include a light source such as an array of light-emitting diodes that produces light. The backlight structures may also include a light guide plate that distributes backlight from the light source over the rear surface of the display. A reflector may be used to reflect light that escapes the light guide plate in an inwards direction back in an outwards direction towards the display. The reflector may be formed from a highly reflective material such as metal.

The electronic device housing may have an opening. Transparent housing structures such as transparent logo structures may be mounted in the opening of the housing. The transparent logo structures may be formed from a material such as translucent plastic. During operation, the logo structures may be illuminated from within the electronic device.

A light guide structure may be used to guide light from a light source such as the light source for the backlight structures to the transparent logo structures. The reflector may be formed from a coating of metal that covers an inner surface of the light guide structure. An outer surface of the light guide structure may be provided with localized light leakage promotion features to cause light to exit the light guide structure and serve as illumination for the logo structures.

Further features of the invention, its nature and various advantages will be more apparent from the accompanying drawings and the following detailed description of the preferred embodiments.

DETAILED DESCRIPTION

Figure 1:
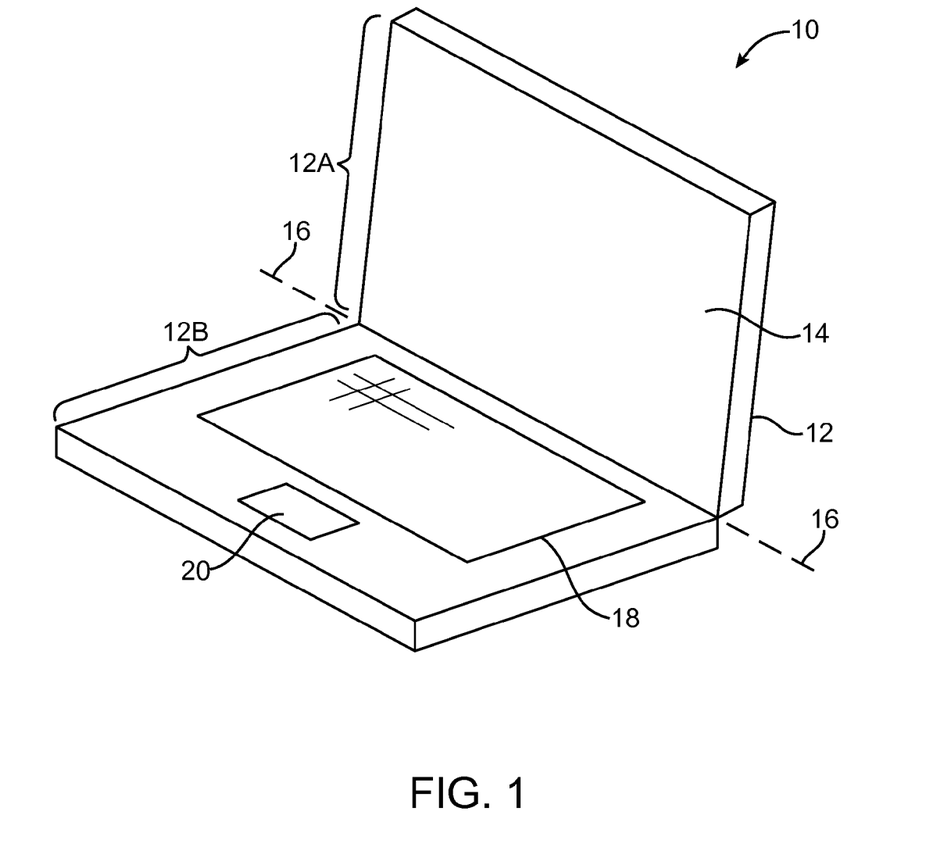
FIG. 1 is a front perspective view of an illustrative electronic device such as a portable computer of the type that may be provided with housing structures such as logo structures that are illuminated in accordance with an embodiment of the present invention.

An illustrative electronic device of the type that may be provided with an illuminated logo or other illuminated housing structures is shown in FIG. 1. Electronic device 10 may be a computer such as a computer that is integrated into a display (i.e., a computer integrated into a computer monitor), a laptop computer, a tablet computer, a somewhat smaller portable device such as a wrist-watch device, pendant device, or other wearable or miniature device, a cellular telephone, a media player, a tablet computer, a gaming device, a navigation device, a computer monitor, a television, or other electronic equipment.

As shown in FIG. 1, device 10 may include a display such as display 14. Display 14 may be a touch screen that incorporates capacitive touch electrodes or other touch sensor components or may be a display that is not touch sensitive. Display 14 may include image pixels formed from liquid crystal display (LCD) components or other suitable display pixel structures. Arrangements in which display 18 is formed using liquid crystal display pixels are sometimes described herein as an example. This is, however, merely illustrative. Any suitable type of display technology may be used in forming display 14 if desired.

Device 10 may have a housing such as housing 12. Housing 12, which may sometimes be referred to as a case, may be formed of plastic, glass, ceramics, fiber composites, metal (e.g., stainless steel, aluminum, etc.), other suitable materials, or a combination of any two or more of these materials.

Housing 12 may be formed using a unibody configuration in which some or all of housing 12 is machined or molded as a single structure or may be formed using multiple structures (e.g., an internal frame structure, one or more structures that form exterior housing surfaces, etc.).

As shown in FIG. 1, housing 12 may have multiple parts. For example, housing 12 may have upper portion 12A and lower portion 12B. Display 14 may be mounted in upper portion 12A (sometimes referred to as a display housing or upper housing). A keyboard such as keyboard 18 and a touch pad such as touch pad 20 may be mounted in housing portion 12B (sometimes referred to as a lower housing or base). Upper housing portion 12A may be coupled to lower housing portion 12B using a hinge that allows portion 12A to rotate about rotational axis 16 relative to portion 12B.

Figure 2:
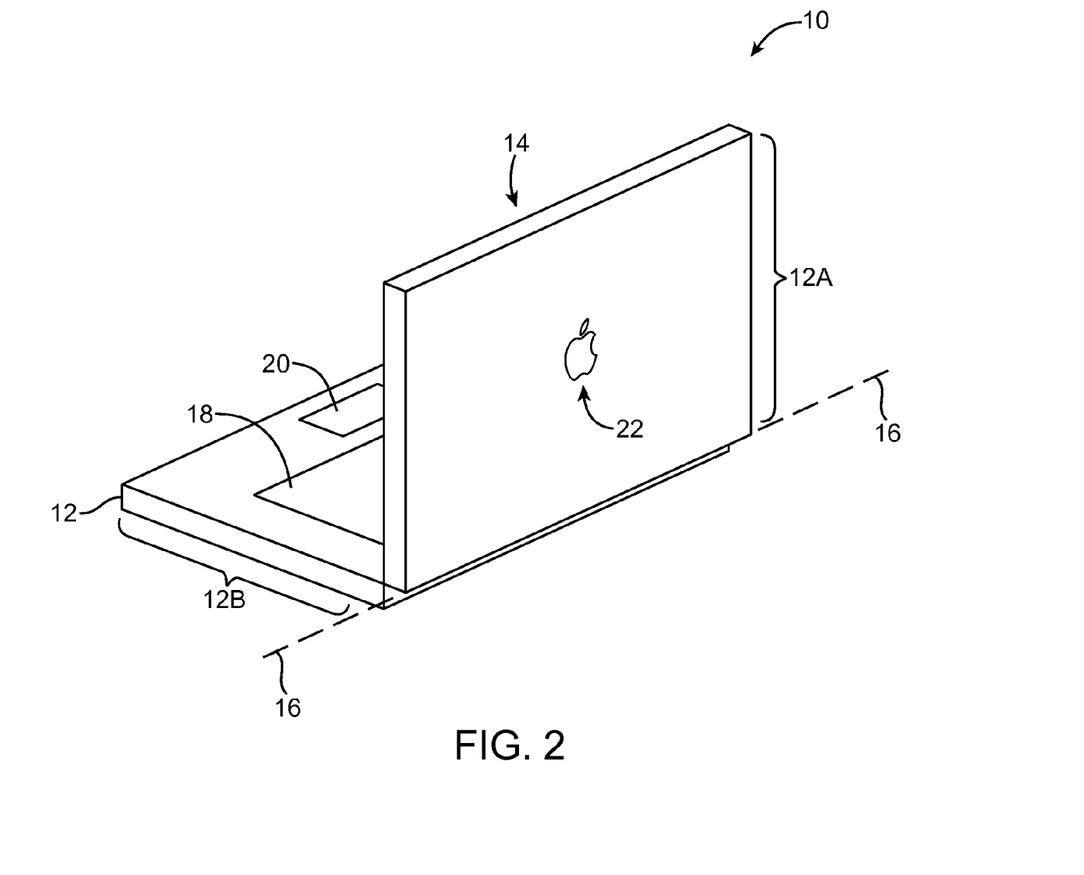
FIG. 2 is a rear perspective view of an illustrative electronic device such as a portable computer of the type that may be provided with housing structures such as logo structures that are illuminated in accordance with an embodiment of the present invention.

FIG. 2 is a rear perspective view of electronic device 10 of FIG. 1 showing how device 10 may be provided with illuminated housing structures such as illuminated logo structures 22. In the example of FIG. 2, illuminated logo structures 22 have been formed in the center of the rear (outer) surface of upper housing portion 12A in housing 12. Housing 12 may, for example, be formed from an opaque material such as opaque plastic or metal (e.g., aluminum). Logo structures 22 may be formed from a material that is at least partly transparent to light, so that logo structures 22 can be illuminated using light from within device 10. Logo structures 22 may have the shape of a logo (e.g., a trademark or other logo that is associated with the manufacturer of device 10 or other organization). If desired, device 10 may be provided with other types of illuminated structures (e.g., illuminated housing structures of other shapes and types). The use of illuminated logo structures is sometimes described herein as an example.

Logo structures 22 are shown as being formed on the outer surface of upper housing portion 12A in device (portable computer) 10 of FIG. 2, but may, if desired, be provided in other suitable locations. For example, in a computer that is integrated into a computer monitor, logo structures 22 may be provided on the rear surface of the housing for the computer monitor. In a tablet computer or cellular telephone, logo structures 22 may be formed on the rear surface of the device housing. Illuminated logo structures or other illuminated structures (e.g., other transparent housing window structures) may also be formed on front housing surfaces, on housing sidewalls, on more than one of these surfaces, or on any other suitable portion of an electronic device housing.

Illuminated logo structures 22 may be formed from a transparent material (e.g., a translucent material) that can be illuminated by illumination structures within housing 12 of device 10. Examples of materials that may be used in forming illuminated logo structures 22 include plastic (e.g., clear plastic, colored plastic, translucent white plastic, or translucent plastic of other colors), colored glass, ceramic, other materials that are transparent to light, or combinations of two or more of these materials. Illuminated logo structures 22 may be mounted in an opaque housing, so that the illumination of logo structures 22 causes logo structures 22 to be brighter than surrounding portions of the housing. Configurations in which some or all of housing 12 is transparent may also be used.

Although a single logo is shown in FIG. 2, device 10 may be provided with any suitable number of logos (or other illuminated housing structures). For example, device 10 may be provided with two or more illuminated logos, three or more illuminated logos, or four or more illuminated logos.

Figure 3:
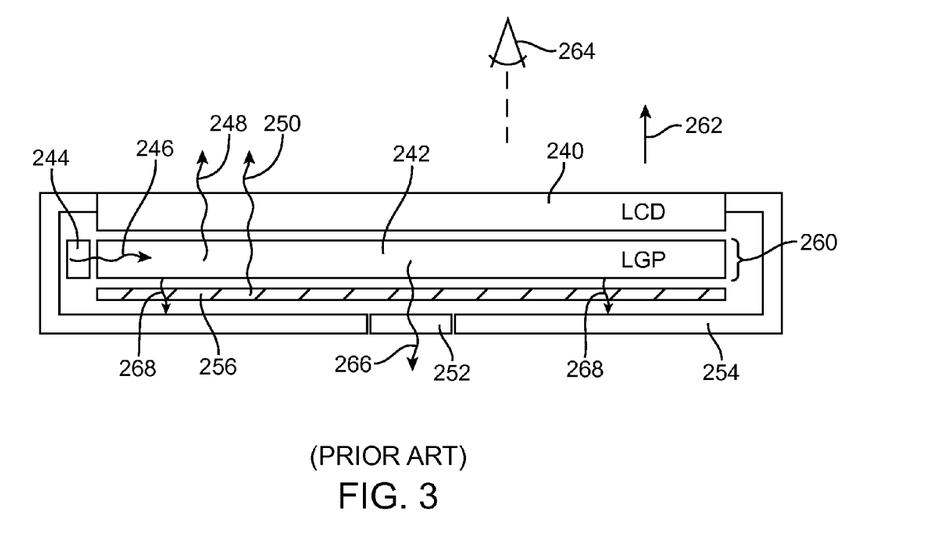
FIG. 3 is a cross-sectional side view of a conventional computer housing that includes an illuminated logo structure.

A cross-sectional view of a conventional upper housing in a portable computer that includes an illuminated logo is shown in FIG. 3. As shown in FIG. 3, components such as liquid crystal display module 240 are mounted within portable computer upper housing 254. Backlight is provided for liquid crystal display module 240 using backlight unit 260. Backlight unit 260 include light-emitting diodes 244, reflector 256, and light guide plate 242. Light-emitting diodes 244 produce light 246 for backlight unit 260. Reflector 256 is formed from a partly transparent sheet of white plastic. Light guide plate 242 is a clear layer of plastic. Light 246 travels within light guide plate 242 due to the principle of total internal reflection. Some of light 242 escapes upwards in direction 262 towards viewer 264 and serves as backlight 248 for display 240. Light 242 that escapes downwards is reflected upwards by reflector 256 and serves as additional backlight 250 for display 240. Logo 252 is formed from translucent white plastic mounted in an opening in housing 258. Reflector 256 allows a fraction of light 246 that has escaped light guide plate 260 and is traveling downwards to pass through reflector 256 to serve as illumination light 266 for logo 252. Light 246 that has passed through reflector 256 in portions of device 10 away from logo 252 (e.g., light rays 268) will be blocked by housing 254 and will not participate in forming illumination for logo 252. The blocking of light rays 268 serves as a source of inefficiency in the logo illumination arrangement of FIG. 3.

Figure 4:
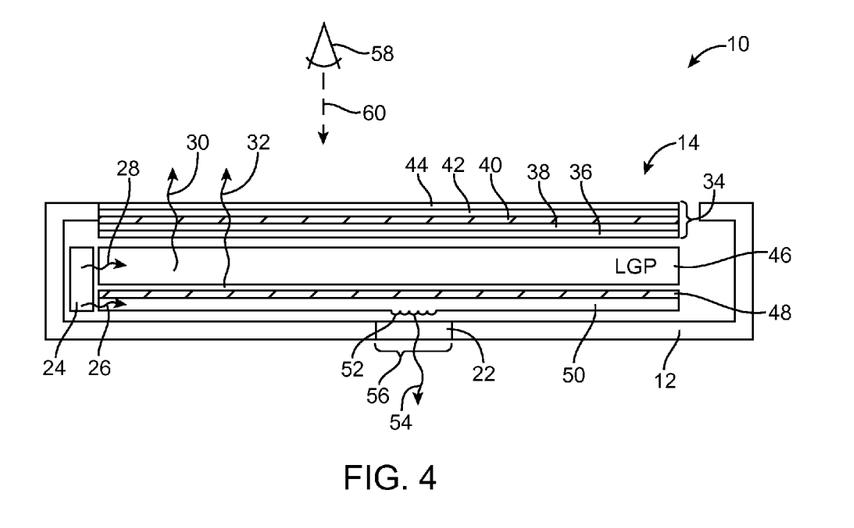
FIG. 4 is a cross-sectional side view of an illustrative electronic device with illuminated housing structures such as illuminated logo structures in accordance with an embodiment of the present invention.

FIG. 4 is a cross-sectional view of an illustrative arrangement that may be used for device 10 in which illumination for logo structures or other housing structures has been provided using light guide structures other than the light guide plate in a backlight unit. As shown in FIG. 4, device 10 may include a display such as display 14. Display 14 may include a display module such as display module 34. Display module 34 may be, for example, a liquid crystal display module. Liquid crystal display module 34 (sometimes referred to as a liquid crystal display, liquid crystal display layers, or liquid crystal display structures) may have any suitable number of display module layers (display layers) such as layers 44, 42, 40, 38, and 36. With one suitable arrangement, layer 44 is an upper polarizer, layer 36 is a lower polarizer, layer 42 is a color filter array layer, layer 38 is a thin-film transistor layer, and layer 40 is a layer of liquid crystal material. Other types of layers may be included if desired (e.g., smudge-resistant layers, scratch resistant layers, antireflection coatings, layers that perform multiple functions such as these, or other suitable layers). An optional cover layer of glass or plastic may be used to cover display 14. If desired, one or more of these display layers may be omitted and/or the layers of display module 34 may be organized in different orders. The arrangement of FIG. 4 is merely illustrative.

Device 10 may include backlight structures for providing backlight illumination for display structures 34. The backlight structures may include a light source such as light source 24, a light guide structure such as light guide plate 46, and a reflector such as reflector 48.

Light source 24 may be formed from light-emitting diode structures or other suitable source of light. For example, light source 24 may be formed from an array of light-emitting diodes mounted on a flexible printed circuit ("flex circuit"), a rigid printed circuit board, or other suitable substrate. There may be light-emitting diodes on one edge of light guide plate 46 or on two or more edges of light guide plate 46. In the example of FIG. 4, light source 24 has been formed from an array of light-emitting diodes along the left-hand edge of light guide plate 46.

Light guide plate 46 may be formed from a clear material such as clear plastic (e.g., clear acrylic). When light such as light 28 is launched into light guide plate 46, the light disperses and travels within light guide plate 46 due to the principle of total internal reflection. This helps distribute light 28 across the entire inner surface of display module 34 and ensures that display 14 will be evenly backlight. With one suitable arrangement, display module 34 may have a rectangular shape (i.e., display 14 may have a rectangular periphery), light guide plate 46 may be rectangular, and light 28 may be distributed over substantially all of the rectangular area of light guide plate 46 and display module 34. If desired, optical films (e.g., a diffuser, a brightness enhancing film, an optical compensator layer, etc.) may be mounted on the upper surface of light guide plate 46.

To improve backlight efficiency, the lower surface of light guide plate 46 may be provided with a reflective layer such as reflector 48. Reflector 48 may be formed from plastic, metal, or other suitable reflective materials. As light 28 exits light source 24 and enters the edge of light guide plate 46, some of light 28 leaks vertically upwards (outwards) and serves as backlight 32. Light 28 that leaks vertically downwards (inwards) towards reflector 48 is reflected back in the upwards direction by reflector 48 and serves as additional backlight 32. Reflector 48 may be configured to reflect 80% or more or 90% or more of light 28 (as an example). Reflector 48 may transmit less than 10%, less than 5%, less than 1%, or less than 0.1% of the light incident on reflector 48. As shown in FIG. 4, backlight 30 and 32 passes through display module 34 and is viewed by a user of device 10 such as viewer 58 who is observing display 14 in direction 60. The backlight that is passing through display module 34 helps the viewer observe images that are displayed on display module 34 by control circuitry within device 10.

In addition to producing light 28 (i.e., backlight that is distributed to display module 34 via light guide plate 46), light source 24 may produce light 26 to illuminate housing structures such as logo structures.

As shown in FIG. 4, housing 12 (e.g., housing 12A of FIG. 1, the housing of a computer monitor with an integrated computer, or other electronic device housing) may be provided with one or more openings such as opening 56. Housing 12 may be formed from aluminum or other metals, plastic, carbon-fiber materials, fiberglass materials, or other fiber-based composites, wood or other organic materials, ceramic, glass, other materials, or combinations of these materials. Openings in housing 12 such as opening 56 may be round, square, may have curved edges, may have straight edges, may have combinations of curved and straight edges, may be formed from a single hole in housing 12 or may be formed from a set of multiple associated holes (e.g., when implementing a logo shape that has separate parts), or may have any other suitable shape. Housing structures (e.g., transparent housing windows) such as logo structures 22 may be mounted in opening 56 (e.g., logo structures 22 may cover opening 56). Logo structures 22 may be formed from a transparent material (e.g., plastic, glass, ceramic, composites, etc.). For example, logo structures 22 may be formed from white translucent plastic.

Light 26 from light source 24 may be emitted into the interior of light guide structure 50. For example, light 26 may be launched into light guide structure 50 through an edge of light guide structure 50. Light guide structure 50 may be formed from a transparent material that can guide light though the principle of total internal reflection. As an example, light guide structure 50 may be formed from a clear structure formed from glass, ceramic, plastic, other materials, or combinations of these materials. Light guide structure 50 may have the shape of a planar rectangular sheet of material (e.g., a light guide plate) or other suitable shape. For example, light guide structure 50 may have a rectangular shape of the same size as display 14 or may cover only a subset of the area of display 14.

To encourage light 26 to exit light guide structure 50 in the vicinity of logo structures 22, light guide structure 50 may be provided with localized optical properties in the vicinity of opening 56 that cause an elevated fraction of the internally guided light in light guide structure 50 to exit light guide structure 50. As shown in FIG. 4, for example, a portion of light guide structure 50 may be provided with structures (features) 52 that enhance light leakage from light guide structure 50 in the portion of light guide structure 50 that is covered by logo structure 22. Structures 52 may cause light 26 to leak outwards from light guide structures 50 (e.g., in the downwards direction in FIG. 4) to serve as illumination 54 (i.e., backlight) for logo structures 22 or other transparent housing structures that form windows between the interior and exterior of housing 12.

Structures 52 may be formed using surface textures on the surface of light guide structure 50. For example, the lower surface of light guide structure 50 may be provided with ribs, circular protrusions (e.g., bumps), pyramidal protrusions, protrusions or other shapes, randomly shaped localized surface roughness, or other textures that promote light leakage by locally discouraging total internal reflection within light guide structure 50. Localized light leakage promotion structures may also be formed in light guide structure 50 using internal features such as bubbles filled with air or particles of other material with an index of refraction that differs from that of the index of refraction for light guide structure 50, metal particles for promoting scattering, or internal structural features (e.g., features formed from metal, plastic, ceramic, or other materials that deflect light 26 outwardly through logo structures 22 as backlight illumination 54). The amount of surface area on light guide structure 50 that is encompassed by localized light leakage promotion structures 52 is preferably less than the total surface area of display 14. For example, if the surface area of display 14 is 600 cm$^2$, the surface area of localized light leakage promotion structures 52 may be about 40 cm$^2$ (as an example). In other configurations, other fractions of the total display area may be consumed by structures 52. For example, structures 52 may have an area that is less than 50% of the total surface area of display 14, less than 20% of the total surface area of display 14, less than 10% of the total surface area of display 14, or less than 5% of the total surface area of display 14. With this type of arrangement, light 26 that has been injected into the interior of light guide structures 50 is encouraged to leak out of light guide structures 50 only where such leakage will allow the leaked light to serve as backlight 54 for logo structure 22, thereby maximizing logo illumination efficiency and reducing power consumption by light source 24.

Figure 5:
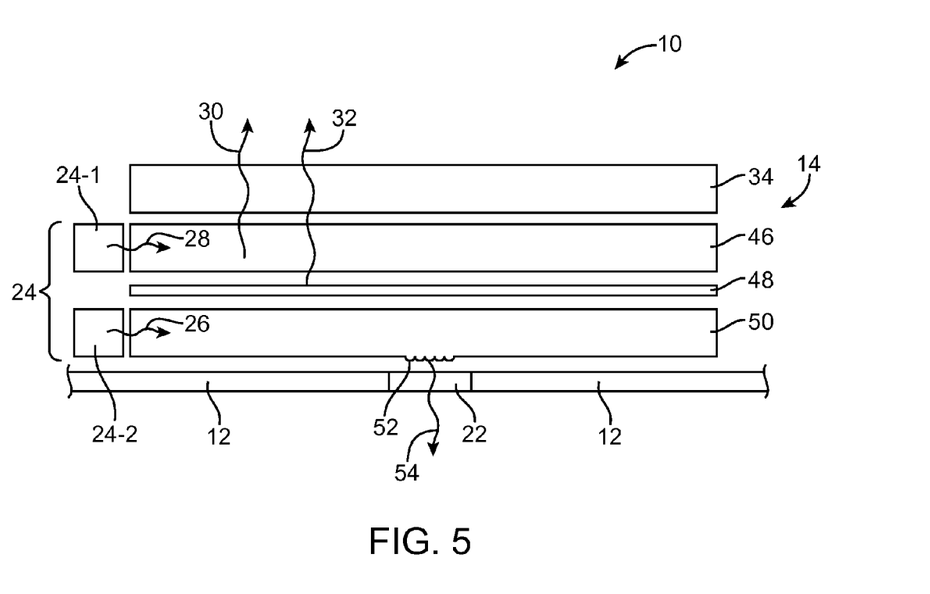
FIG. 5 is a cross-sectional side view of an illustrative display and illustrative structures for illuminating a logo or other housing structures in which separate light sources are used to provide display backlight and housing structure illumination in accordance with an embodiment of the present invention.

As shown in FIG. 5, light source 24 may, if desired, have one portion such as portion 24-1 that is used for providing light 28 for light guide plate 46 and another portion such as portion 24-2 that is used for providing light 26 for light guide structure 50. In light guide plate 46, light 28 may be used to produce display backlight 30 and 32 for display module 34. In light guide structure 50, light 26 may be used to produce logo backlight for logo structures 22 in housing 12.

Light source 24-1 may be formed from one or more light-emitting diodes mounted on a printed circuit or other suitable substrate. Light source 24-2 may be formed from one or more separate light-emitting diodes. The light-emitting diodes of light source 24-2 may be mounted to a printed circuit or other substrate. The substrate on which light source 24-1 is mounted may be different than the substrate on which light source 24-2 is mounted or light sources 24-1 and 24-2 may be mounted on a common printed circuit.

Figure 6:
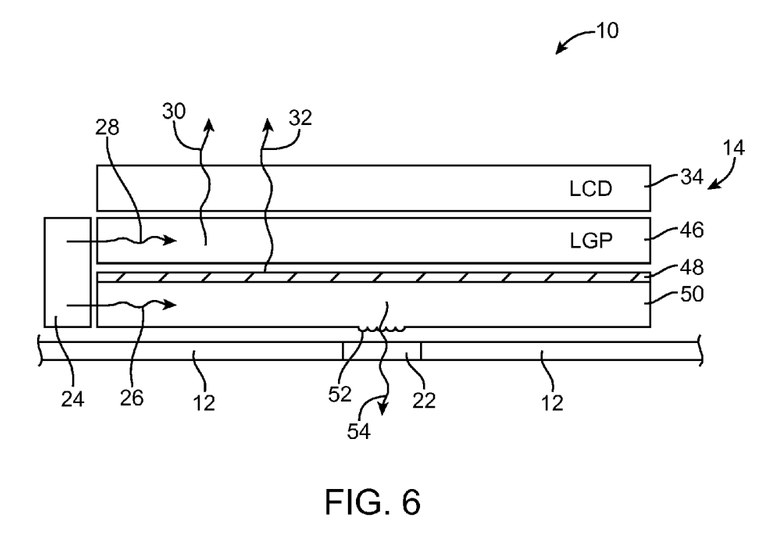
FIG. 6 is a cross-sectional side view of an illustrative display and illustrative structures for illuminating a logo or other housing structures in which a reflective backlight layer for the display has been formed as a coating on an upper surface of a housing structure illumination light guide layer in accordance with an embodiment of the present invention.

Another illustrative configuration that may be used for providing logo illumination in device 10 is shown in FIG. 6. In the arrangement of FIG. 6, light reflector 48 has been implemented using a material layer that is attached to the upper surface of light guide structure 50. Light reflector 48 of FIG. 6 may be, for example, a layer of material that is attached to light guide structure 50 using adhesive. Light reflector 48 of FIG. 6 may be formed from white plastic, metal (e.g., metal foil), or other reflective substances. With one suitable arrangement, light reflector 48 may be formed by depositing a coating of metal on light guide structure 50 (e.g., using physical vapor deposition or other suitable coating techniques). The coating of metal may be highly reflective (e.g., the metal coating layer may reflect 70% or more of incident visible light, 80% or more of incident visible light, or 90% or more of incident visible light (as examples) and may transmit less than 10% or less than 1% of the incident visible light (as examples). In this type of configuration, it may be desirable to implement light guide structure 50 using a piece of material that is sufficiently large to cover substantially all of the area of display 14 (i.e., so that reflector 48 is used to reflect light 32 upwards over substantially all of display 14). The logo illumination structures of FIG. 6 use a common light source 24 to produce light 28 and light 26. If desired, separate light sources such as light sources 24-1 and 24-2 may be used, as described in connection with FIG. 5.

Figure 7:
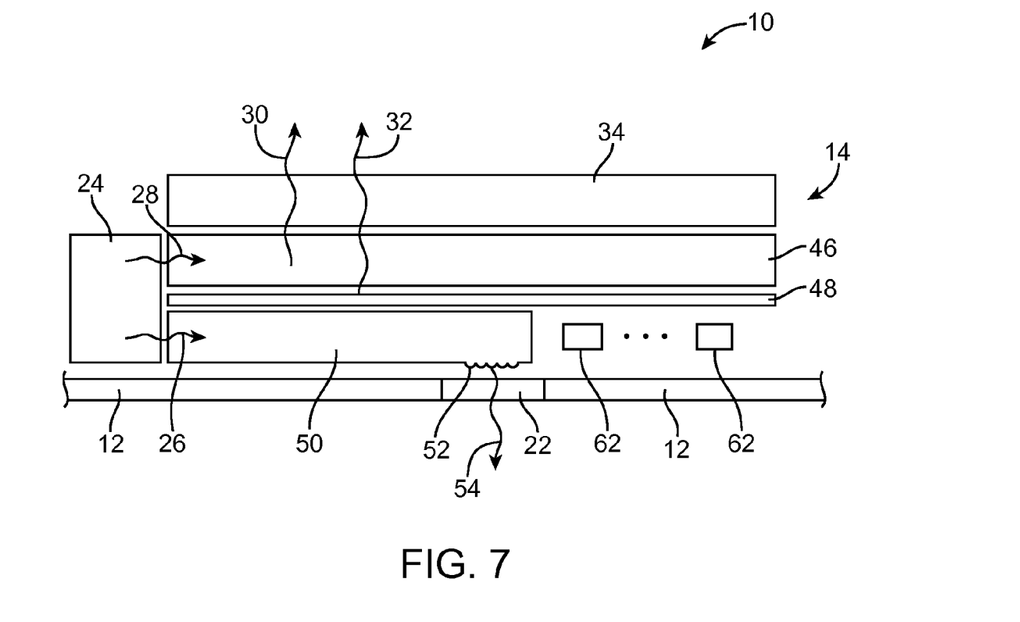
FIG. 7 is a cross-sectional side view of an illustrative display and illustrative structures for illuminating a logo or other housing structures in which a light guide structure that extends partway under a backlight reflector layer has been used to provide illumination in accordance with an embodiment of the present invention.

FIG. 7 shows how light guide structure 50 may be formed over only part of the area of display 14. In the example of FIG. 7, light guide structure 50 is being used to distribute light 26 to structures 52 that are located in the center of display 14. Light leakage promotion structures 52 in light guide structure 50 may cause light 26 to exit light guide structure 50 and pass through logo structure 20 as logo illumination (backlight) 54. Light guide structure 50 of FIG. 7 is only formed on the left-hand side of display 14 (in the orientation of FIG. 7), so there is room for additional internal device components such as electrical components 62 within housing 12. To ensure that there is satisfactory upwards light reflection from reflector 48, reflector 48 may be configured to cover the entirety of display 14 (i.e., reflector 48 may have the same area as display module 34 and may overlap the entire rear surface of display module 34).

Figure 8:
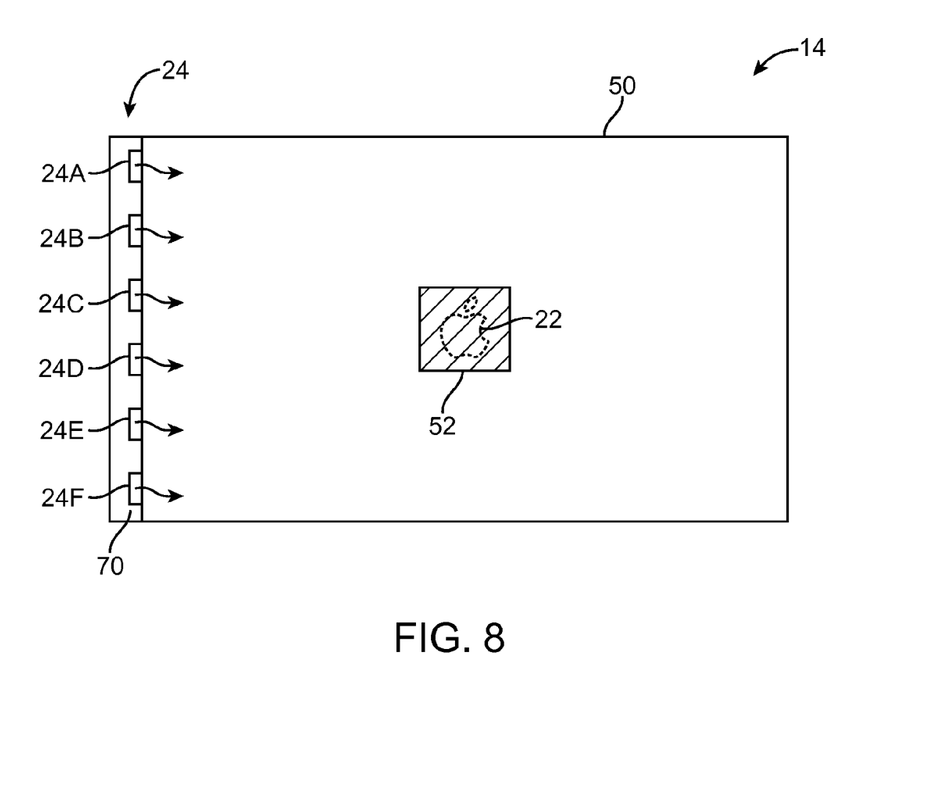
FIG. 8 is a bottom view of a light source that is being used to launch light into logo illumination structures formed from a light guide layer with a modified portion for locally enhancing light leakage for use in logo illumination in accordance with an embodiment of the present invention.

FIG. 8 is a bottom view of light guide structure 50 showing how light leakage promotion structures 52 may be formed in the shape of a rectangle or other shape in the center of light guide structure 50 (as an example). Light 26 may be emitted from light source 24 into the edge of light guide structure 50. When light 26 reaches light leakage promotion structures 52, light 26 may exit light guide structure 50 (out of the page in the orientation of FIG. 8) and may serve as backlight illumination for logo structures 22 that overlap structures 52. Light source 24 may include light-emitting diodes such as light-emitting diodes 24A, 24B, 24C, 24D, 24E, and 24F. The light-emitting diodes of light source 24 may be mounted on printed circuit substrate 70. As shown in FIG. 8, the light-emitting diodes of light source 24 may be arranged to form a one-dimensional array along the left-hand edge of light guide structure 50 (as an example). As with the other illustrative configurations for display 14, some of the light produced by light source 24 may serve as display backlight and some of the light produced by light source 24 may serve as logo structure illumination.

Figure 9:
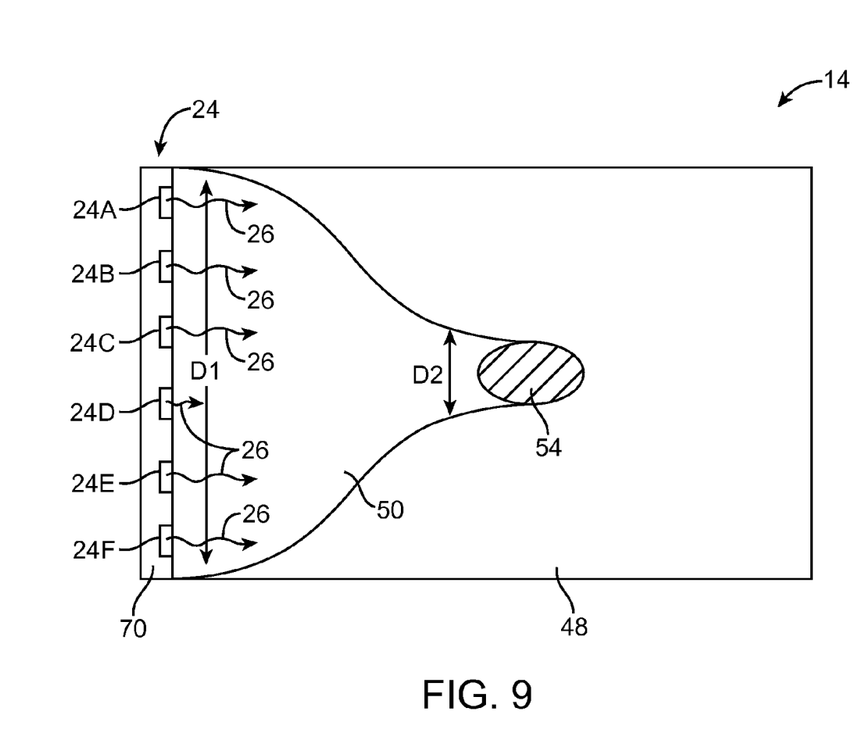
FIG. 9 is a bottom view of a light source that is being used to launch light into logo illumination structures formed from a light guide layer with a portion that narrows towards a modified region that locally promotes light leakage for logo illumination in accordance with an embodiment of the present invention.

FIG. 9 is a bottom view of light guide structure 50 in an illustrative arrangement in which light guide structure 50 has been configured to cover only part of the surface area of display 14. In particular, light guide structure 50 has been configured to taper inwardly as structure 50 extends towards light-leakage promotion features 54. At the left edge of display 14, light guide structure 50 of FIG. 9 has a lateral dimension D1 that spans display 14. This allows the left edge of light guide structure 50 to receive light from all of the light-emitting diodes in light source 24 (as an example). Near the center of display 14, light guide structure 50 of FIG. 9 narrows to a lateral dimension D2. The narrowing of light guide structure 50 may help guide and concentrate light 26 towards light leakage promotion structures 54. As with reflector 48 of FIG. 7, reflector 48 in the arrangement of FIG. 9 may be configured to cover the entirety of display 14 to ensure that there is satisfactory upwards light reflection from reflector 48 over the entire area of display 14.

Figure 10:
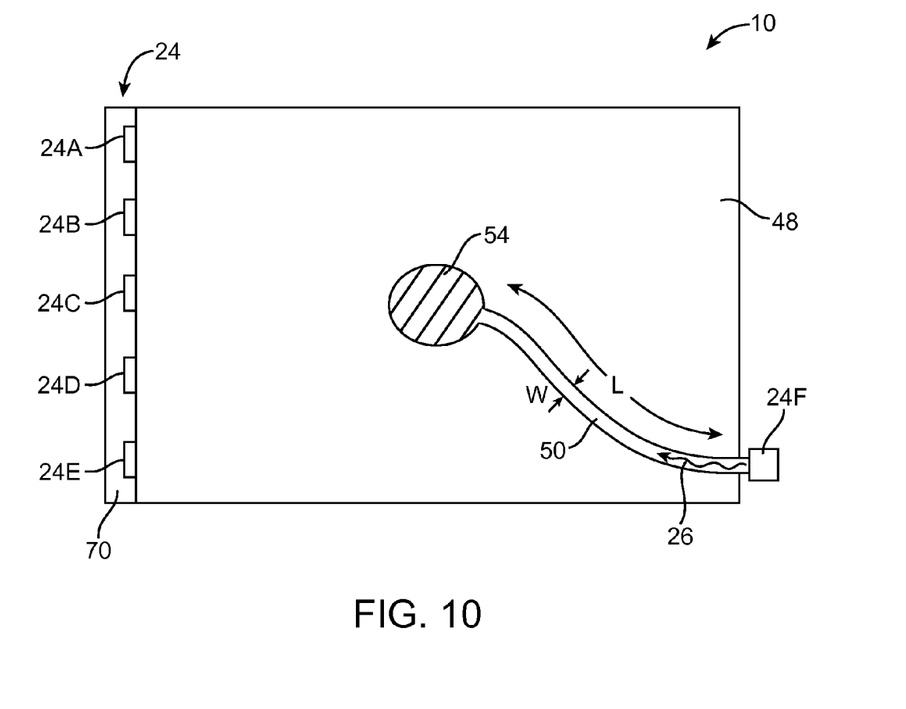
FIG. 10 is a bottom view of logo illumination structures that have a modified region that locally promotes light leakage for logo illumination and a light guide that carries light from a dedicated light source to the modified light leakage promotion region in accordance with an embodiment of the present invention.

FIG. 10 is a bottom view of light guide structure 50 in an illustrative arrangement in which light guide structure 50 has been used to route light 26 from the right-hand side of display 14 to light leakage promotion structures 54 in the center of display 14. Light guide structure 50 of FIG. 10 has a relatively narrow width W that is significantly smaller than its length L (e.g., five times or more, ten times or more, etc.). Light guide structure 50 of FIG. 10 may be provided with light 26 using light source 24F. Light source 24F may be, for example, a light-emitting diode. With this type of arrangement, light source 24 and its light-emitting diodes 24A, 24B, 24C, 24D, and 24E may be used exclusively to produce light 28 to serve as backlight for display 14, whereas light-source 24F may be used exclusively to produce light 26 to serve as illumination for logo structures 22. The mounting locations for light sources 24 and 24F of FIG. 10 are merely illustrative. Other mounting locations may be used if desired. For example, light-emitting diode 24F may be located along the left-hand edge of display 14 with the light-emitting diodes of light source 24. Moreover, light structure 50 may have other suitable shapes (e.g., a shape that covers all of display 14, a shape that covers only the right-hand side or only the left-hand side of display 14, etc.). Reflector 48 may extend over the entire surface of display 14, to ensure that backlight for display 14 is distributed uniformly.

The foregoing is merely illustrative of the principles of this invention and various modifications can be made by those skilled in the art without departing from the scope and spirit of the invention.

What is claimed is:

1. An electronic device, comprising:
    a housing;
    a transparent housing structure mounted in an opening in the housing, wherein the transparent housing structure has a first width;
    a display in the housing that has a second width;
    a display backlight reflector that reflects backlight through the display;
    a light source;
    a first light guide structure through which light is conveyed from the light source to the display; and
    a second light guide structure that conveys light from the light source to the transparent housing structure, wherein the display backlight reflector is interposed between the first light guide structure and the second light guide structure, wherein the light conveyed by the second light guide structure passes through the transparent housing structure, wherein the second light guide structure has a first portion that is adjacent to the light source and has a third width, wherein the second light guide structure has a second portion that is adjacent to the transparent housing structure and has a fourth width, wherein the first width is substantially equivalent to the fourth width, wherein the second width is substantially equivalent to the third width, and wherein the fourth width is smaller than the third width.

2. The electronic device defined in claim 1 wherein the display backlight reflector comprises a layer of metal that transmits less than 1% of the backlight.

3. The electronic device defined in claim 2 further comprising a light guide plate that receives the backlight from the light source.

4. The electronic device defined in claim 3 wherein the light guide plate comprises a planar sheet of clear plastic having an edge that receives light from the light source.

5. The electronic device defined in claim 2 wherein the second light guide structure comprises a planar sheet of clear plastic.

6. The electronic device defined in claim 5 wherein the transparent housing structure comprises a logo structure.

7. The electronic device defined in claim 6 wherein the second light guide structure comprises light-leakage promotion structures that overlap the logo structure and that locally cause the light from the light source to exit the second light guide structure and pass through the logo structures.

8. The electronic device defined in claim 7 wherein the light-leakage promotion structures comprise protrusions on a surface of the second light guide structure.

9. The electronic device defined in claim 8 wherein the housing comprises an opaque material.

10. The electronic device defined in claim 9 wherein the housing comprises a portable computer upper housing.

11. The electronic device defined in claim 9 wherein the housing comprises a housing selected from the group consisting of: a portable computer housing, a housing for a computer monitor with an integrated computer, a computer monitor housing, a cellular telephone housing, and a tablet computer housing.

12. An electronic device, comprising:
an opaque housing having an opening;
a housing structure in the opening;
a light source;
a light guide structure having first and second opposing surfaces;
a liquid crystal display module;
a light guide plate; and
a reflector that covers the first surface, wherein the light guide structure conveys light from the light source through the housing structure in the opening, wherein the light guide structure comprises light-leakage promotion structures within a region at the second surface of the light guide structure that is defined by the opening in the housing structure, wherein the second surface of the light guide structure has a planar portion, wherein the second surface of the light guide structure has a plurality of protrusions that extend towards the housing structure, wherein the plurality of protrusions extend past the planar portion of the second surface of the light guide structure, wherein the plurality of protrusions form the light-leakage promotion structures, wherein the light guide plate is interposed between the reflector and the liquid crystal display module and provides backlight to the display module, wherein the reflector comprises a metal coating on the first surface of the light guide structure, wherein the light guide plate receives the backlight from the light source, wherein the light guide structure comprises a clear plastic sheet, wherein the housing structure comprises a logo structure, wherein the light-leakage promotion structures overlap the logo structure and cause light received from the light source to pass through the housing structure, wherein the logo structure comprises translucent plastic, wherein the housing structure comprise metal, wherein the light guide structure has a width and a length, wherein the width is at least five times smaller than the length, and wherein the light guide structure routes light from a single light-emitting diode to the opening.

13. The electronic device defined in claim 1, wherein the second light guide structure continuously narrows from the third width to the fourth width to guide light from the light source to the transparent housing structure.

14. The electronic device defined in claim 12, wherein the opening is positioned in a center of the display, wherein the display has a first surface area, wherein the opening has a second surface area, and wherein the second surface area is less than twenty percent of the first surface area.

15. The electronic device defined in claim 12, wherein the liquid crystal display module has a first surface area, wherein the region of the light guide structure has a second surface area, and wherein the second surface area is less than twenty percent of the first surface area.

* * * * *